UNITED STATES PATENT OFFICE.

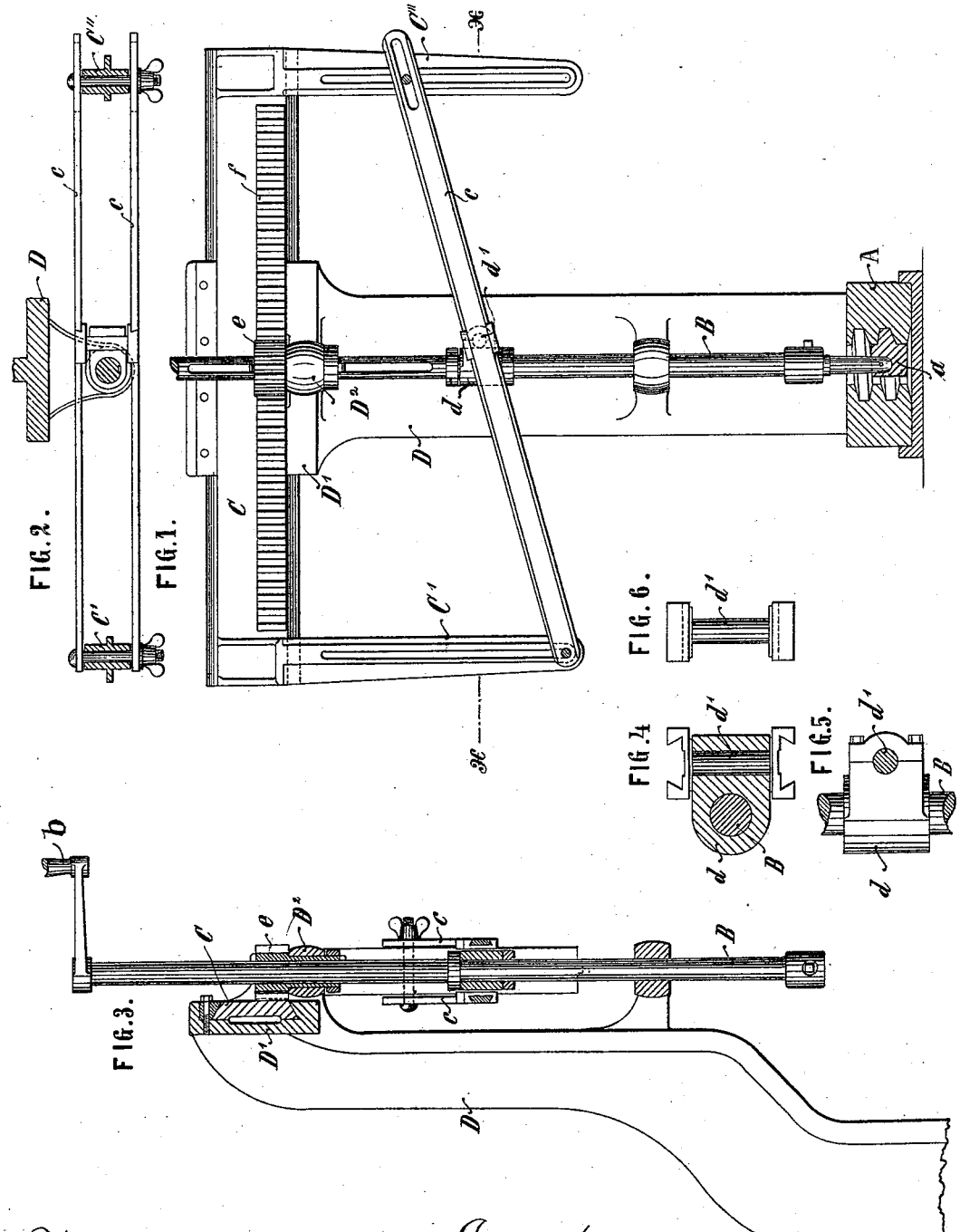

OTTO HENNING, OF MAGDEBURG-BUCKAU, GERMANY, ASSIGNOR TO THE GRUSONWERK, OF SAME PLACE.

MACHINE FOR FORMING SCREW-THREADS.

SPECIFICATION forming part of Letters Patent No. 518,146, dated April 10, 1894.

Application filed March 27, 1893. Serial No. 467,783. (No model.) Patented in Germany October 15, 1890, No. 55,994, and in England June 30, 1892, No. 12,172.

*To all whom it may concern:*

Be it known that I, OTTO HENNING, a subject of the King of Prussia, residing at Magdeburg-Buckau, in the Kingdom of Prussia, German Empire, have invented new and useful Improvements in Machines for Forming Screw-Threads in Molds for Casting Screws, Worms, or the Like, (for which I have obtained a patent in Germany, No. 55,994, bearing date October 15, 1890, and in Great Britain, No. 12,172, bearing date June 30, 1892,) of which the following is a specification.

My invention herein described relates to a molding machine by means of which molds to be used for casting screws, worms, or the like, having left or right handed threads of any desired pitch, are made by a templet moving up and down in spiral lines.

The said invention consists chiefly in the combination with a shaft which carries a templet, of adjustable inclined guide rods, and a sliding support which is moved laterally through the medium of suitable gearing by the templet shaft, and which, during this lateral movement causes the said shaft and templet to move up and down and thereby forms the screw-threads in the mold.

In order that my invention may be clearly understood I will now proceed to describe the same with reference to the accompanying drawings, in which—

Figure 1 is an elevation of a machine constructed according to my invention. Fig. 2 is a sectional plan on the line $x\,x$ of Fig. 1. Fig. 3 is a vertical central section of Fig. 1. Fig. 4 is a sectional plan, and Figs. 5 and 6 are elevations, of parts of the apparatus which are hereinafter more particularly explained.

Like letters indicate corresponding parts throughout the drawings.

A is the mold of sand, loam or other suitable material in which the screw or worm thread is to be made.

$a$ is a templet by the turning of which in spiral lines the screw-thread is produced in the mold. This templet is fixed to a vertical shaft B which is turned by hand with the aid of the crank $b$, or is otherwise operated. In order to form screw-threads the templet must, during the turning movement, also be moved up and down. This vertical movement is effected by inclined rods $c$ which during the rotation of the templet shaft are displaced horizontally while kept parallel to their initial position, and slide in guides $d'$ provided on a sleeve $d$ embracing the shaft B. For this purpose the rods $c$ are held by means of clamping screws to the two arms $C'$ and $C''$ of a support C which can be moved to and fro in a horizontal guide $D'$ of the frame D. The horizontal motion of the support is effected by a toothed pinion $e$ which is held in a bearing $D^2$ and connected to the shaft B by means of a groove and key so that the shaft can slide in the pinion which gears with a rack $f$ on the said support. When the crank $b$ is turned, the toothed pinion $e$ forces the support C with the rods $c$, either to the right or to the left hand side of the machine, and, during this movement, in consequence of the inclination of the rods $c$, the shaft B is raised or lowered, and the circular movement of the templet $a$ is thus converted into a helical movement. For enabling the pitch of the screw to be altered the rods $c$ are made adjustable, in suitable slots of the arms $C'$ and $C''$ and the guides $d'$ are arranged to turn on the sleeve $d$, Fig. 4, so that they permit this adjustment. It will be obvious that in this manner any desired pitch may be given to the screw, moreover right and left handed threads can be produced, according as the rods $c$ are more or less inclined toward one side or the other.

The arrangement of the sliding support and its guide may be modified; for instance the said support, instead of being arranged as shown, may be placed below the rods $c$. Moreover the guides $d'$ for the rods, the manner of holding the said rods to the arms $C'$ and $C''$, and the means for permitting the adjustability of their inclination, may be varied.

What I do claim as my invention, and desire to secure by Letters Patent, is—

1. In a machine for forming screw threads in molds such as herein specified, a shaft carrying a templet and arranged in combination with a sliding support and with one or more guide rods, in such a manner that by its rotation the said shaft imparts lateral movement to the said support, which, by means of the said inclined guide rods, moves the templet shaft up and down through a distance corresponding with the pitch of the screw.

2. In a machine for forming screw-threads, the combination of the longitudinally adjustable rotating shaft carrying the templet and having an inclined guide and the transversely moving support having sliding connection with said guide, substantially as and for the purpose set forth.

3. In a machine for forming screw-threads, the combination of the longitudinally adjustable rotating shaft, carrying the templet and having upon it a guide by which it may be moved longitudinally and which is adjustable in its angle, and the transversely sliding support having adjustably mounted upon it sliding connections engaging the guide on said shaft, substantially as and for the purpose set forth.

4. In a machine for forming screw threads, the combination of a rotary shaft carrying the templet, and having a bearing, a sleeve embracing said shaft and means for advancing the shaft with the templet consisting of the inclined guide engaging the sleeve, and mounted to move transversely of the shaft, as and for the purpose explained.

5. In a machine for forming screw threads, the combination of a rotary shaft mounted to be advanced longitudinally in its bearings, means for advancing said shaft consisting of the sleeve embracing the shaft and the inclined guide rod engaging said sleeve and movable transversely to the shaft, and working connections for imparting the transverse movement to the guide rod, from the rotary movement of the shaft, whereby the latter is rotated and advanced simultaneously, substantially as and for the purpose explained.

6. In a machine for forming screw threads, the combination of the shaft carrying the templet, and having means for rotating it, bearings in which the shaft may be advanced longitudinally and means for advancing said shaft consisting of the inclined guide-rod movable transversely to the shaft and having suitable sliding connections therewith; said guide-rod being adjustably mounted for the purpose of changing its angle of inclination, and thereby alter the pitch of the screw thread, as explained.

7. In a machine for forming screw threads, the combination of a longitudinally adjustable rotating shaft carrying the thread forming templet, and means for adjusting the shaft longitudinally as it rotates, consisting of the inclined guide rod having sliding connection with the shaft, and mounted to move transversely to the same, a rack for moving said inclined guide-rod, and a pinion on the shaft, engaging the rack, substantially as explained.

8. In a machine for forming screw-threads, the combination of the longitudinally adjustable rotating shaft, carrying the templet, and the means for adjusting the shaft longitudinally for forming any desired pitch of thread, consisting of the inclined guide-rod having sliding connection with the shaft, and the sliding support for holding and moving the guide-rod transversely to the shaft, formed with a pair of arms to which the ends of the guide rod are adjustably connected, as explained.

9. In a machine for forming screw-threads, in molds, the combination of a shaft, carrying a templet, a sliding support adapted to be moved by said shaft, a sleeve mounted on said shaft and provided with guides adapted to turn thereon and the guide-rods adjustably connected to the sliding support and movable in said guides, substantially as and for the purposes explained.

10. In a machine for forming screw threads in molds, the combination of a frame D, a shaft B carrying a templet, adapted to move in a vertical direction, and journaled in said frame, a support C movable transversely in said frame and provided with a rack and slotted arms C', a pinion on the shaft B engaging said rack, a sleeve $d$ in which the shaft rotates, and the adjustable inclined guide-rods $c$ carried by the arms C', and sliding in the collar $d$, substantially as and for the purpose set forth.

OTTO HENNING.

Witnesses:
KARL E. DETZNER,
EMIL KALLNECKER.